United States Patent [19]

Müller et al.

[11] 4,151,257
[45] Apr. 24, 1979

[54] PROCESSING NONFERROUS METAL HYDROXIDE SLUDGE WASTES

[75] Inventors: Wolfgang Müller, Mannheim; Lothar Witzke, Bruhl, both of Fed. Rep. of Germany

[73] Assignee: Th. Goldschmidt AG, Essen, Fed. Rep. of Germany

[21] Appl. No.: 869,446

[22] Filed: Jan. 16, 1978

[51] Int. Cl.$^2$ .................. C01G 3/10; C01G 37/14; C01G 9/06; C01G 53/10

[52] U.S. Cl. .................................. 423/24; 423/40; 423/53; 423/54; 423/127; 423/132; 423/139; 423/150

[58] Field of Search .................... 423/24, 40, 41, 53, 423/54, 100, 109, 139, 150, DIG. 14

[56] References Cited

U.S. PATENT DOCUMENTS

| | | | |
|---|---|---|---|
| 3,479,378 | 11/1969 | Orlandini et al. | 423/24 |
| 3,544,309 | 12/1970 | Fletcher et al. | 423/54 |
| 3,545,920 | 12/1970 | George et al. | 423/112 |
| 3,856,916 | 12/1974 | Lefrancois et al. | 423/54 |
| 3,966,569 | 6/1976 | Reinhardt et al. | 423/139 |
| 4,009,101 | 2/1977 | Hayashi | 423/139 |
| 4,029,733 | 6/1977 | Faugeras et al. | 423/24 |

OTHER PUBLICATIONS

Reinhardt, H., "Solvent Extraction for Recovery of Metal Waste", *Chemistry and Industry,* Mar. 1, 1975, pp. 210–213.

*Primary Examiner*—Brian Hearn
*Attorney, Agent, or Firm*—Toren, McGeady and Stanger

[57] ABSTRACT

A method for recovering nonferrous metal values from hydroxide sludge wastes containing same by first chlorinating the aqueous waste to oxidize the chromium therein, separating the insoluble components therefrom and treating the resulting Cr(VI) solution in a fixed bed anion exchanger to separate the Cr(VI) from the solution, separating the copper from the aqueous solution by liquid-liquid extraction, separating the zinc from the copper-free solution by liquid-liquid extraction, precipitating and separating the aluminum in the form of hydroxide from the zinc-free solution and then separating the nickel from the aluminum-free solution by liquid-liquid extraction, and recovering the nonferrous metals from the respective solutions and precipitates by conventional procedures.

3 Claims, No Drawings

PROCESSING NONFERROUS METAL HYDROXIDE SLUDGE WASTES

BACKGROUND OF THE INVENTION

1. Field of the Invention

The invention relates to a method for processing nonferrous metal hydroxide sludge wastes containing chromium, copper, zinc and nickel as the important nonferrous metals and for simultaneous recovery and separation of the individual nonferrous metals.

2. Description of the Prior Art

The hydroxide sludge wastes which are generally obtained in galvanic processes and in the nonferrous metal processing industry, typically contain the following components (figures refer to percent by weight):

| | | |
|---|---|---|
| Water | 40 to 90, on the average: | 70 |
| Iron | 0 to 10, on the average: | 2 |
| Aluminum | 0 to 2, on the average: | 0.5 |
| Chromium (III) | 0 to 10, on the average: | 2 |
| Zinc | 0 to 10, on the average: | 2 |
| Copper | 0 to 5, on the average: | 1 |
| Nickel | 0 to 5, on the average: | 1 |
| Calcium | 0 to 20, on the average: | 4 |
| Sodium | 0 to 2, on the average: | 0.5 |
| Silicic Acid | 0 to 5, on the average: | 1 |
| Cyanide (as a complex) | 0 to 0.1, | — |
| Sulfite | trace | — |
| Carbonate | 0 to 5, | |
| Chloride | trace, | |
| Sulfate | trace. | |

These hydroxide sludge wastes contain a large quantity of water and the content of the valuable metals is too small to allow economical smelting of these wastes. However, the wastes are a burden on the environment and they can only be deposited in special garbage dumps which is very costly. Therefore, a method for cleanly disposing or destroying of these wastes is highly desirable. Even more desirable, on the other hand, would be a method for processing and recovery of the valuable materials and metal values in the waste.

It has been suggested that such wastes be destroyed by admixing them with the raw materials used in the brick production. Furthermore, processing methods from hydrometallurgy and waste water treatment technology are known. However, these methods provide only unsatisfactory recovery of one or two and, hardly ever of more of the materials contained in the waste.

There are also a number of methods for the separation of metals in fixed bed ion exchangers or for their removal from waste water solutions. However, these do not provide for a selective separation of the valuable nonferrous metals and, usually, mixed solutions are obtained which are precipitated collectively and the thus created residue has to be deposited in the form of waste sludge.

A method for recovering copper and zinc from nonferrous scrap metals is known from the the German disclosure Offenlegungsschrift No. 2,340,399 wherein the sludge is leached by means of an ammonium carbonate solution in the presence of oxygen and then the metals are separated from the leaching liquor as copper ammonium carbonate or zinc ammonium carbonate. Such a method cannot be used for the processing of nonferrous metal hydroxide sludge wastes since the content of calcium would disturb the ammonium carbonate equilibrium and, also, chromium hydroxide would remain in the residue.

The liquid-liquid extraction of copper and nickel from ammoniacal solution is known, as is the liquid-liquid extraction of copper at pH values of 1 to 3. These methods are usually performed in combination with electrolysis wherein the final electrolyte is used for stripping off the metal-charged organic phase. Furthermore, there are known methods for extracting zinc from solutions containing sulfuric acid and zinc with the aid of organic liquids and for stripping off the zinc with the aid of an electrolyte in an electrolysis process. All the described extraction methods have a commonality in that the separation can be performed only when the elements iron, calcium, aluminum, and chromium are not present.

Experiments for selectively precipitating the nonferrous compounds from waste sludge have failed because significant amounts of the accompanying elements have been precipitated too.

SUMMARY OF THE INVENTION

Applicants have discovered a method for the separation and recovery of the individual nonferrous metals from sludge wastes of the above type wherein the metals are recovered sequentially. Thus, the individual nonferrous metals, such as, chromium, copper, zinc, and nickel can be individually and economically separated from the collected nonferrous metal hydroxide sludge wastes in a generally continuously performed method. This is achieved by the combination of the following steps performed in sequence.

a. Chlorinating the aqueous waste sludge suspension at temperatures of 20° to 80° C. and pH values between 4 and 13. The chlorinated sludge is then acidified with sulfuric acid to a pH of 1.0 to 3.0. The insoluble components are then separated, followed by the separation of the chromium (VI) from the solution using a fixed bed anion exchanger (at pH values of <3);

b. The copper is separated from the remaining solution by means of known and conventional liquid-liquid-extraction procedures;

c. The zinc is separated from the remaining solution which also contains chloride and sulfate by means of liquid-liquid-extraction; and d. The aluminum is precipitated and separated from the remaining solution in the form of the hydroxide and the nickel is separated from the filtrate by means of liquid-liquid-extraction.

The individual nonferrous metal fractions thus obtained in method steps (a) to (d) are then processed in conventional manners.

In the above-described method, the chromium(III) is converted to chromium(VI) and after the subsequent treatment with sulfuric acid, the soluble sulfates of copper, zinc, and nickel are obtained and interfering components, such as calcium sulfate, basic iron sulfate and primarily silicic acid are separated in the form of insoluble residues. The chromium(III) may also be converted into the selectively separable Cr(VI) form by the usual oxidizers, such as, hydrogen peroxide, potassium permanganate, etc. However, oxidation with chlorine has been proven to be the most economical method. The subsequent recovery of chromium(VI) by means of a fixed bed anion exchanger as the first method step is advantageous, because the liquid-liquid-extraction of the nickel would be disturbed by the presence of chromium(III) and, therefore, the acid processing has not been possible up to now.

By means of the liquid-liquid-extraction of copper and zinc, in a combination and sequence of steps not previously known and by the precipitation of aluminum in the form of hydroxide, nickel is obtained in a highly concentrated form by means of the liquid-liquid-extraction. Essential in the sequence of the method steps is the separation of the disturbing accompanying elements, such as, calcium, iron, silicon, and aluminum.

DESCRIPTION OF THE PREFERRED EMBODIMENTS

In the present process, all of the nonferrous metal hydroxide sludge wastes are transferred to a suspension having a solid matter content of about 15% by weight and a pH value of 4 to 13, preferably close to the neutral value and with a reaction temperature between 20° and 80° C., and, under vigorous stirring and the continuous adding of alkali liquor, chlorine is added until no further significant increase of the chromium(VI) content occurs.

In this chlorination step, iron(II), sulfite, cyanide, and oxidizable organic components are all simultaneously oxidized. After the chlorination, sulfuric acid is added to the suspension while the suspension is stirred until a pH value of less than 3 and preferably from 1.5 to 2.5 is obtained.

This treatment with sulfuric acid leads to the formation of the sulfates of copper, nickel, zinc, and aluminum and, at the same time, dichromate is obtained. Iron and calcium are converted to compounds which are, for practical purposes insoluble and silicic acid is also obtained. By means of filtration, the soluble components are separated from the insoluble residues and the insoluble residues which are primarily the above-mentioned sulfates and silicic acid, may be rejected.

This chlorination treatment of the sludge containing the metal hydroxides and the subsequent treatment with sulfuric acid is a technically superior method to the ammoniacal leaching methods known in the prior art. Whereas the ammoniacal leaching for nickel, copper, and iron achieves leaching percentages of only 50 to 90%, the chlorinating conversion of the copper, chromium, nickel, and zinc in the present process reaches almost 100%.

The filtrate, free of residue, is now transferred to a fixed bed anion exchanger. The anion exchanger may, for example, be a macroporous anion exchanger composed of styrene with weakly basic amino groups, although others are known and conventional and may be used. Such an anion exchanger has an especially high resistance to oxidation.

The anion exchanger is then charged with solutions containing sulfate or dichromate ions. The solutions may contain up to about 10 g/l chromium(VI) in the form of dichromate ions. With the aid of at least two exchangers arranged in series containing the described resin in the form of sulfate or chloride, the dichromate is collected and then eluted by means of alkali liquor having a concentration of about 4 to 8% by weight. The extracted materials contain 100 to 200 g/l alkali chromate or alkali dichromate which, immediately or after their processing into crystals may be used in the tanning industry or for the manufacture of pigments. Furthermore, the chromate or dichromate thus obtained can be used as an intermediate material in the manufacture of chromic oxide.

The chromium-free refined solution discharged from the exchanger columns is essentially free of silicic acid which formerly was in a colloidal state. This silicic acid would have a disturbing influence in the following liquid-liquid extraction since it forms emulsion layers that do not separate. p Liquid-liquid extraction is the method of exchanging metal ions or hydrogen ions between two liquid immiscible phases wherein one phase is the aqueous phase and the other phase is the organic solvent phase. In the subsequent separation of copper by means of liquid-liquid extraction, known extraction means can be used, for example, systems of substituted hydroxybenzophenonoximes with petroleum. For example, materials, such as, 2-hydroxy-5-nonyl acetophenone oxime, 2-hydroxy-5 sec-dodecylbenzophenone oxime, or 5,8-diethyl-7-hydroxy-6-dodecano-oxime or a compound having the formula:

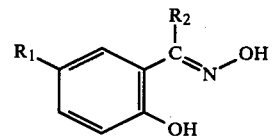

wherein $R_1$ is $C_9H_{19}$, and
$R_2$ is methyl.

Other complexing systems for copper are known.

In this particular system, the pH value of the aqueous phase should be maintained at about 1.5 and 2.5. The acidic metal salt solution may contain up to 10 g/l copper and the accompanying elements, such as, zinc, nickel, and aluminum, have no disturbing influence in the same concentration. In three to five consecutive mixer-settler-steps of the extraction, the copper content of the aqueous phase, depending on the initial concentration, can be lowered to values below 0.01 g/l.

The mixer-settlers are box-shaped, two-part containers in the first part of which the mixing of the inorganic and organic phases takes place, while in the second part, the two phases are separated. The mixing promotes the intimate contact of the liquid phase with the aqueous phase for the desired exchange of material. The organic phase is carried in countercurrent flow to the aqueous phase.

It is advantageous, especially in chloride-containing solutions, to clean the organic phase containing copper after it leaves the extraction step with water, a sodium sulfate or copper sulfate solution. Subsequently, the organic phase is stripped off in a three-step mixer-settler device by means of a copper end electrolyte (100 to 200 g H$_2$SO$_4$/l), i.e., a high acid content spent electrolyte from an electrolytic cell. A copper electrolyte or a copper sulfate solution containing more than 50 g Cu/l and less than 0.05 g/l of foreign metals and a regenerated organic phase containing traces of copper are obtained. The obtained copper salt solution can, for example, be used in the production of cathodic copper by copper electrolysis.

From this solution which is freed of chromium and copper, zinc is separated by means of liquid-liquid extraction whereby the above-mentioned mixer-settler device is used. Especially suitable as an extraction means are organo-phosphoric acids having the formula (OR)$_2$POOH wherein R is alkyl. A typical extractant would be di-(2-ethylhexyl-)phosphoric acid dissolved with petroleum solvents. Suitable petroleum solvents include kerosenes or benzines which are low in aromatic substances and have a boiling range of about 190° to 240° C., e.g., Shellsole K. After three to five mixer-settler steps, the zinc content of the refined solution is reduced to less than 0.01 g/l.

The pH value of the inflowing inorganic aqueous phase should be held to about 2 to 3. The charged organic phase which, depending on the content of the di-(2-ethyl-hexyl) phosphoric acid, may contain from about 10 to 30 g/l zinc, is stripped off in three mixer-settler steps by means of diluted sulfuric acid (100 to 200 g $H_2SO_4$/l) using countercurrent flow. The stripped off extracted material contains zinc in a concentration of more than about 100 g Zn/l and can be used in the form of an electrolyte for feeding to a conventional zinc electrolysis process.

Methods are known for recovering zinc from relatively pure sulfatic solutions or from waste water and for extracting zinc from solutions containing large amounts of chloride in the form of a chloro-complex. However, methods for extracting zinc, in addition to nickel and aluminum, from sulfatic solutions so that the stripped-off extracted materials are practically free of heavy metals and to produce a high content of zinc sulfate were not known prior to the present invention.

In the present invention, after chromium, copper and zinc have been separated, it is possible that the aqueous refined solution contains traces of these elements and that the solution contains most of the aluminum and nickel. When preparing the solution for the separation of nickel and aluminum, the pH value of the solution is adjusted to 3.5 to 4.5 by adding soda and/or lime. This precipitation also causes the partial precipitation of the nickel and traces of chromium, copper and zinc. After decantation and filtration, a major part of the nickel is obtained in the filtrate. The residue is treated with alkali liquor, causing the freshly precipitated aluminum to practically entirely dissolve in the form of sodium aluminate while the traces of the metals chromium, copper, zinc and nickel remain undissolved in the form of carbonates or hydroxides and can be returned to the method step (a), i.e., the chlorination step, for reprocessing.

Nickel is then separated from the first filtrate of the hydroxide precipitation by means of liquid-liquid extraction. It has been proven that a suitable extraction means is the sodium-form of the di-(2-ethyl-hexyl-)phosphoric acid dissolved with the free acid of this compound and with high-boiling aromatic solvents, such as, trimethylbenzene or xylene. A disadvantage of the abovementioned sodium-di-(2-ethyl-hexyl-)phosphate lies in the fact that it dissolves well in water but not in organic diluents. However, by the use of conventional solubilizing agents, a homogeneous phase is created during charging as well as after stripping-off. However, in the present invention, we have surprisingly discovered that it is possible to work without the use of solubilizing agents and an excess of di-(2-ethyl-hexyl-)phosphoric acid, if the dilution with the high-boiling aromatic solvent contains more than 40% by volume of di-(2-ethyl-hexyl-)phosphoric acid. When these conditions are observed, distributions of the nickel between the phases are obtained which will allow an economical separation.

It has become apparent that when the nickel-containing aqueous solution is extracted with the sodium salt of the di-(2-ethyl-hexyl-)phosphoric acid in corresponding dilution, practically two mixer-settler steps are sufficient to decrease the nickel content of the aqueous solution (refined solution) from about 6 g/l to <10 mg/l.

The organic phase, fully charged with nickel (30 to 40 g Ni/l), is stripped-off in two mixer-settler steps by means of concentrated hydrochloric acid or a $NiCl_2$-solution containing hydrochloric acid or by solutions containing amidosulfonic acid so that highly concentrated nickel salt solutions are directly obtained. Depending on the desired end use of the stripping-off acid, solutions of nickel chloride, nickel sulfate or nickel sulfamate may be obtained. These solutions or the salts obtained on cyrstallization from these solutions can be used directly by the galvanization industry for nickeling.

When the method proceeding according to the present invention is employed, large yields (98.5 to 99.5%) of the valuable nonferrous metals contained in the hydroxide sludge wastes are obtained. The solutions remaining after the method has been performed, contain only traces of these elements. In addition, the chlorinating leaching combined with sulfuric acid and the connected separation of the nonferrous metal elements results in further reduction of the initial amount of waste sludge to about one third.

The following example further demonstrates the method according to the present invention.

EXAMPLE 100 parts by weight of moist galvanic sludge having the following analysis in percent by weight was used:

| | |
|---|---|
| 69.6 - $H_2O$ | 1.4 - Fe |
| 1.5 - Cu | 0.4 - Al |
| 1.7 - Cr | 2.6 - Ca |
| 1.3 - Ni | 0.7 - $SiO_2$ |
| 3.0 - Zn | |

This sludge was mixed with 80 parts by weight of water. While constantly stirring at 50° C. and maintaining a pH value of 6.5 by adding soda lye, chlorine gas was supplied to the mixture. The incoming flow was 260 parts by volume of chlorine gas per hour, measured at room temperature. The flow was continued for 5 hours and 24 parts by weight soda lye in a concentration of 32% were used up. The time of cessation of the flow of chlorine gas was determined by measuring the chromium(VI) content in the suspension.

After the oxidation was terminated, within 30 minutes, 23 parts by weight of sulfuric acid were added and the pH value was thus adjusted to 2.5. After another 30 minutes, the suspension was filtered and washed with about 30 parts by weight of water, the first wash water was combined with the filtrate and the residue was rejected.

Obtained were 18 parts by weight filter residue containing 67 parts by weight solid matter, 0.1% by weight Cr, 0.05% by weight Cu, 0.03% by weight Ni, 0.02% by weight Zn, 14% by weight Ca, 3% by weight $SiO_2$ and 7.5% by weight Fe as well as 280 parts by weight raw solution containing 6.7 g Cr/l, 6.0 g Cu/l, 5.2 g Ni/l, 12 g Zn/l, 1.2 g Al/l, <0.1 g Fe/l and 0.6 g $SiO_2$/l.

For separation of the chromium(VI), the raw solution was fed for 2 hours through a column filled with 22 parts by volume of a weakly basic anion exchanger on the basis of styrene in the $SO_4^{--}$ form. The anion exchanger was almost fully charged by the amount of chromium(VI) contained in the raw solution.

After the chromium separation step, the filtrate of the raw solution contained 0.08 g/l chromium(III) and <0.1 g SiO₂/l, while the other components remained almost unchanged.

The ion exchanger, charged with chromium, was first fully charged with a second charge of raw solution to displace impurities in the first charge of raw solution and then rinsed with water and finally eluted with 44 parts by weight of NaOH in a concentration of 6% by weight. The fractions rich in chromium and discharged at pH values of 3 to 8, containined more than 95% of the amount of chromium used in a concentration of 20 to 60 g/l Cr.

The filtrate, free of chromium, was then fed to a solvent extraction step for extraction of the copper. The extraction means used was a solution of benzophenoxime with a concentration of 20% by volume in kerosene which had a low concentration of aromatic substances (<0.1%) and a boiling range of 192°-254° C. The apparatus used in this step are four mixer-settlers arranged in series, each having 1 liter mixer volume and a 4 liter settler volume. The flow through the organic phase was, on the average, 12.5 l/h and the flow through the inorganic phase to be extracted was 10.0 l/h.

The concentration of Cu in the organic phase reached approximately 4.8 g/l, while the so-called refined solution contained 0.002 g/l Cu in the aqueous phase which was extracted in four steps. Between the second and the third step, the pH value of the aqueous phase was adjusted to 2.0 by adding NaOH.

For stripping off the copper, the organic phase charged with copper was brought into contact in three identical subsequent mixer-settler steps with sulfuric acid having a concentration of 140 g/l H₂SO₄. In the process, the copper content of the organic phase dropped to 0.1 g/l and the copper content of the acid increased to 82 g/l. In addition, the extracted material obtained in the stripping-off step contained 0.005 g Ni/l, <0.001 g Al/l, 0.001 g Zn/l, <0.001 g Cr/l and <0.1 g Cl/l.

The refined solution obtained after the extraction of copper still contains 12 g Zn/l, 5.2 g Ni/l, 1.2 g Al/l and traces of Cu, Cr, Fe and SiO₂.

For the separation of the zinc, this solution was treated in four mixer-settler steps having the same design as those used for the copper separation with an extraction solution of 20% by volume di-(2-ethyl-hexyl-)phosphoric acid in kerosene having a low concentration of aromatic substances (<0.1% - boiling point 192-254). The flow through the inorganic phase was 10.0 l/h and the flow through the organic phase 8.0 l/h. In this way, a phase charged with zinc (app. 15 g Zn/l) was obtained.

After the second extraction step, the pH value of the aqueous solution was adjusted to 3.0 by supplying NaOH.

In the "dezinced" refined solution, 0.1 g Zn/l could still be found after the fourth step.

For stripping off the zinc from the organic phase charged with the zinc, the latter was treated with sulfuric acid (200 g H₂SO₄/l) in three mixer-settler steps. In this process, the zinc content of the organic phase dropped to about 0.1 g/l and the zinc content of the inorganic phase reached 102 g Zn/l. In the extracted material obtained, when stripping off the zinc, no nickel and no chloride could be detected.

To the refined solution which is now free of zinc, copper and chromium, a soda solution with a concentration of 10% was added at 50° C. until a pH value of 4.5 was reached and a precipitate was produced.

The thus produced precipitate, composed primarily of aluminum compounds, was separated by decantation, washing, and repeated decantation. Thus, an aqueous solution with a pH value of 4.5 g containing 4.5 g Ni/l and also containing alkali chloride and sulfate was obtained.

This solution was fed to a third solvent extraction step at a flow of 10 l/h for the separation of the nickel. This solvent extraction also consisted of three steps. The extraction means employed was a solution of 40% by volume di-(2-ethyl-hexyl-)phosphoric acid in a solvent rich in aromatic substances, such as, trimethylbenzene, with a boiling range of 172°-192° C., the solution having been neutralized to a pH value of 6.5 by adding NaOH.

The flow through the organic phase was app. 1.5 l/h. After three extraction steps, a nickel content of 29.6 g/l was reached in the organic phase while the refined nickel solution contained <0.01 g/l nickel.

To recover the nickel, the organic phase, charged with the nickel, was stripped in three mixer-settler steps with HCl in a concentration of 30% by weight. In this process, 0.34 l of NiCl₂-solution containing 130 g Ni/l was obtained per hour.

What is claimed is:

1. A method for separately recovering nonferrous metals from hydroxide sludge wastes which contain as the main nonferrous metals, chromium, copper, zinc, and nickel, comprising the steps of:
   a. chlorinating the aqueous waste sludge suspension at temperatures of about 20° to 80° C. and pH values between 4 and 13, acidifying the chlorinated waste with sulfuric acid to reach a pH value from 1.0 to 3.0, separating the insoluble components therefrom to produce a solution containing Cr(VI) and treating this aqueous solution in a fixed bed anion exchanger at pH values of <3 to separate the Cr(VI) therefrom;
   b. separating the copper from the aqueous solution remaining from step a) by liquid-liquid extraction at a pH from 1.5 to 2.5 using an extraction liquid selected from the group consisting of substituted hydroxybenzophenonoximes diluted with petroleum;
   c. separating the zinc at a pH about 2 to 3 from the aqueous solution containing chloride and sulfate remaining from (b) by liquid-liquid extraction using as the extraction means an organophosphoric acid having the formula (OR)₂POOH wherein R is alkyl;
   d. precipitating and separating the aluminum in the form of hydroxide from the aqueous solution remaining from step c) by filtration thereof and separating the nickel from the filtrate by liquid-liquid extraction wherein the extracting agent is the sodium salt of the diluted di-(2-ethylhexyl-) phosphoric acid with a highly boiling aromatic solvent, the amount of di-(2-ethylhexyl-)phosphoric acid in the mixture being 40% by volume.

2. The method of claim 1 wherein the chlorination step is performed at pH values of 6 to 7.

3. The method of claim 1 wherein the extraction liquid used in method step c) is di-(2-ethyl-hexyl-)phosphoric acid diluted with petroleum.

* * * * *